United States Patent [19]
Kelerich et al.

[11] Patent Number: 5,857,501
[45] Date of Patent: Jan. 12, 1999

[54] FUELING SYSTEM

[75] Inventors: David Kelerich, Ramat Hasharon; Dov Talmor, Herzliya, both of Israel

[73] Assignee: Rapac Network International, Inc., Engelwood, N.J.

[21] Appl. No.: 649,648

[22] PCT Filed: Nov. 28, 1994

[86] PCT No.: PCT/US94/13611

§ 371 Date: Jul. 24, 1996

§ 102(e) Date: Jul. 24, 1996

[87] PCT Pub. No.: WO95/14612

PCT Pub. Date: Jun. 1, 1995

[30] Foreign Application Priority Data

Nov. 28, 1993 [IL] Israel ........................................ 107784

[51] Int. Cl.[6] ................................ B65B 1/30; B67C 3/02
[52] U.S. Cl. ............................ 141/94; 141/98; 141/231; 141/351; 340/825.54; 705/413
[58] Field of Search ................... 141/94, 98, 231, 141/351; 340/825.34, 825.35, 825.54; 705/413

[56] References Cited

U.S. PATENT DOCUMENTS

| | | | |
|---|---|---|---|
| 3,148,713 | 9/1964 | Jones | 141/346 |
| 3,642,036 | 2/1972 | Ginsburgh | 141/94 |
| 4,095,214 | 6/1978 | Minasy | 340/258 |
| 4,109,686 | 8/1978 | Phillips | 141/1 |
| 4,263,945 | 4/1981 | Vaness | 141/98 |
| 4,469,149 | 9/1984 | Walkey | 141/94 |
| 4,544,005 | 10/1985 | Meissner | 141/94 |
| 4,846,233 | 7/1989 | Fockens | 141/94 |
| 4,934,419 | 6/1990 | Lamont | 141/94 |
| 4,977,935 | 12/1990 | Durkee | 141/99 |
| 5,070,293 | 12/1991 | Ishii | 320/2 |
| 5,095,309 | 3/1992 | Troyk et al. | 340/825.54 |
| 5,156,198 | 10/1992 | Hall | 141/94 |
| 5,204,819 | 4/1993 | Ryan | 340/825.35 |
| 5,249,612 | 10/1993 | Parks | 141/219 |
| 5,339,250 | 8/1994 | Durbin | 340/825.35 |
| 5,605,182 | 2/1997 | Oberrecht et al. | 141/94 |

FOREIGN PATENT DOCUMENTS

| | | |
|---|---|---|
| 0476858 | 3/1992 | European Pat. Off. . |
| 2502134 | 3/1981 | France . |
| 1577920 | 10/1980 | United Kingdom . |

*Primary Examiner*—J. Casimer Jacyna
*Attorney, Agent, or Firm*—Ladas & Parry

[57] ABSTRACT

A vehicle mounted fueling system identification unit including an inductive communication loop arranged to surround a fuel intake pathway of a vehicle and circuitry powered by electric power inductively received by the loop for transmitting via the loop at least one of the following parameters: vehicle identification number, credit information, required fuel particulars.

3 Claims, 13 Drawing Sheets

FUELING SYSTEM

FIELD OF THE INVENTION

The present invention relates to fuel management systems for use with motor vehicles generally.

BACKGROUND OF THE INVENTION

Fuel management systems which monitor fuel usage by vehicles and record the identity and other particulars of vehicles being fueled are known. The Fuelomat (Trade Mark) automated fuel management system is commercially available from Del Pak Systems Ltd. A subsidiary of Orpak Industries (1983) Ltd. of Israel, the present applicant/assignee. Patents showing fuel management systems include the following U.S. Pat. Nos. 5,156,198; 4,846,233; 4,469,149; 4,263,945; 4,109,686 and 3,642,036.

SUMMARY OF THE INVENTION

The present invention seeks to provide a passive, interrogatable vehicle mounted unit for use in fuel management systems of the type described hereinabove.

There is thus provided in accordance with a preferred embodiment of the present invention, a vehicle mounted fueling system identification unit including an inductive communication loop arranged to surround a fuel intake pathway of a vehicle and circuitry powered by electric power inductively received by the loop for transmitting via the loop at least one of the following parameters: vehicle identification number, credit information, required fuel particulars.

There is also provided in accordance with a preferred embodiment of the present invention, a vehicle including a chassis and a fuel tank with fuel intake pathway mounted thereon and a fueling system identification unit including an inductive communication loop arranged to surround the fuel intake pathway and circuitry powered by electric power inductively received by the loop for transmitting via the loop at least one of the following parameters: vehicle identification number, credit information, required fuel particulars.

There is additionally provided in accordance with a preferred embodiment of the present invention, a vehicle fueling system including:

at least one fuel dispensing station, each including at least one fuel pump and associated delivery nozzle, a first inductive power transmission and communication loop associated with the delivery nozzle, a transmitter for transmitting electrical energy via the first inductive communication loop and a data receiver for receiving data via the first inductive communication loop, and a multiplicity of vehicles, each including a chassis and a fuel tank with fuel intake pathway mounted thereon and a fueling system identification unit including a second inductive communication loop arranged to surround the fuel intake pathway and circuitry powered by electric power inductively received by the second inductive communication loop from the transmitter for transmitting via the second inductive communication loop at least one of the following parameters: vehicle identification number, credit information, required fuel particulars.

Preferably, the circuitry is operative for transmitting via the second inductive communication loop at least two of the following parameters: vehicle identification number, credit information, required fuel particulars.

In accordance with a preferred embodiment of the present invention, the circuitry is operative for transmitting via the second inductive communication loop all of the following parameters: vehicle identification number, credit information, required fuel particulars.

Preferably the second inductive communication loop associated with the fuel intake pathway is fixed thereto and is generally not exposed to view. In accordance with a preferred embodiment of the present invention, the second inductive communication loop is provided with a self-destruct device which destroys the intended functionality thereof automatically in response to unauthorized tampering therewith.

Preferably, the circuitry which is powered by electrical power inductively received from an induction coil associated with the nozzle is programmable circuitry.

In accordance with a preferred embodiment of the present invention, the fuel intake pathway is defined by a fuel inlet pipe.

Preferably, the second inductive communication loop is mounted on the interior of the fuel inlet pipe.

In accordance with a preferred embodiment of the present invention, the circuitry is mounted on the interior of the fuel inlet pipe.

Preferably, one or both of the inductive communication loops and the circuitry are mounted in an expandable housing which is securely mountable interior of the fuel inlet pipe. Fuel inlet pipes do not have a standard diameter and the expandable housing allows mounting in a variety of diameters.

In accordance with a preferred embodiment of the present invention, the expandable housing is formed with a ratchet-type securing assembly.

Alternatively, the expandable housing is formed with compression actuated expansion joints.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
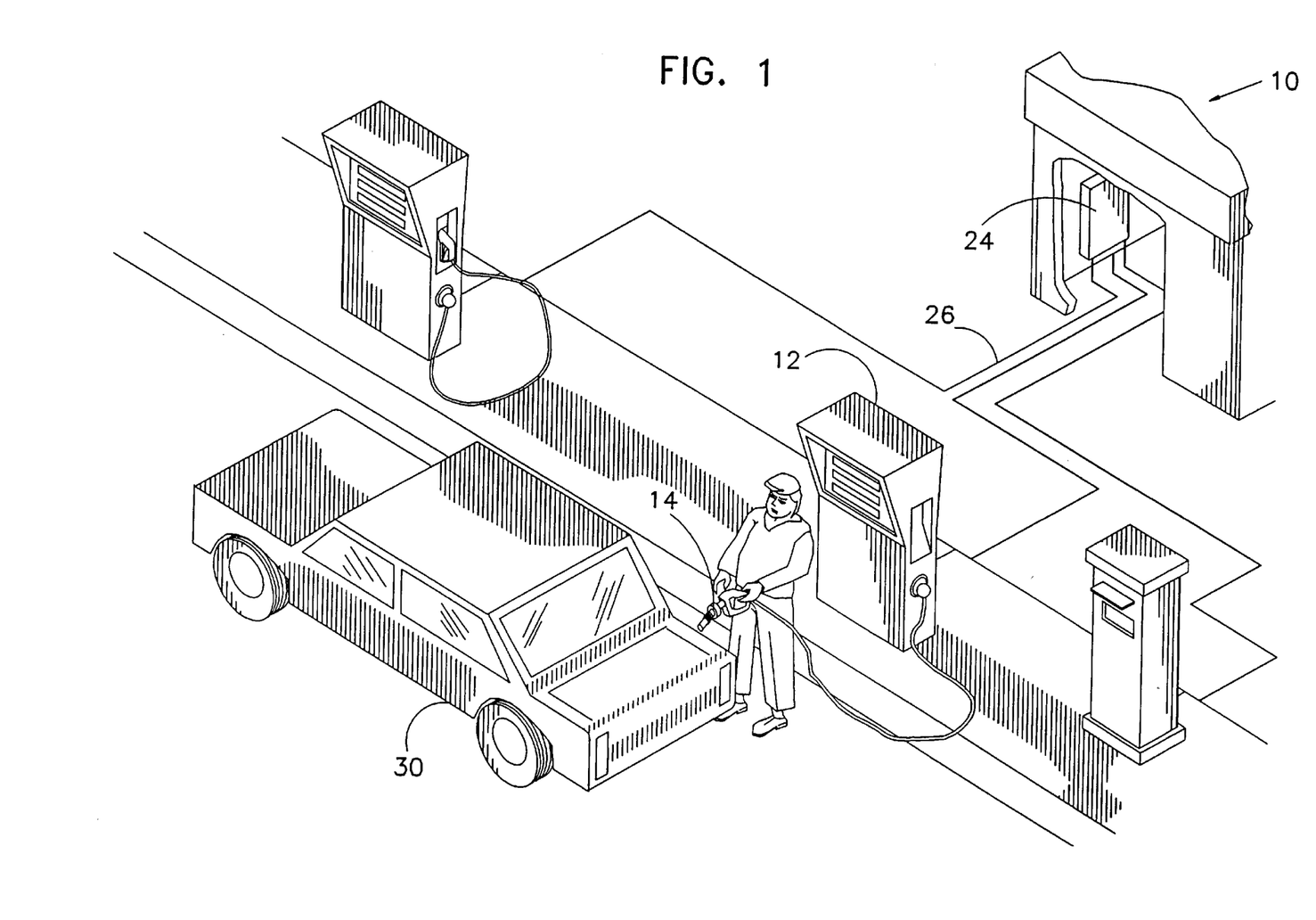
FIG. 1 is a pictorial illustration of part of a fueling system constructed and operative in accordance with a preferred embodiment of the present invention.

Reference is now made to FIG. 1, which illustrates a fueling system constructed and operative in accordance with a preferred embodiment of the present invention. The fueling system comprises at least one and preferably a plurality of fuel dispensing stations 10, each including at least one fuel pump 12 and associated delivery nozzle 14.

Figure 2A:
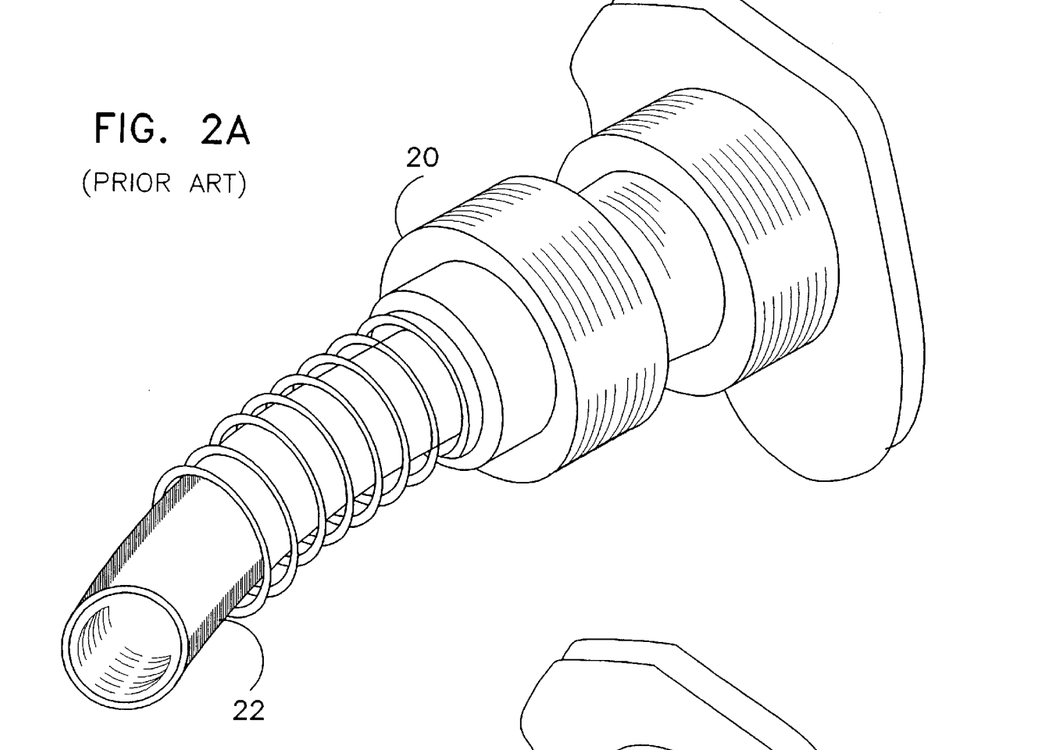
FIG. 2A is a simplified illustration of the mounting of an inductive communication loop and associated circuitry on a fuel delivery nozzle.
Figure 2B:
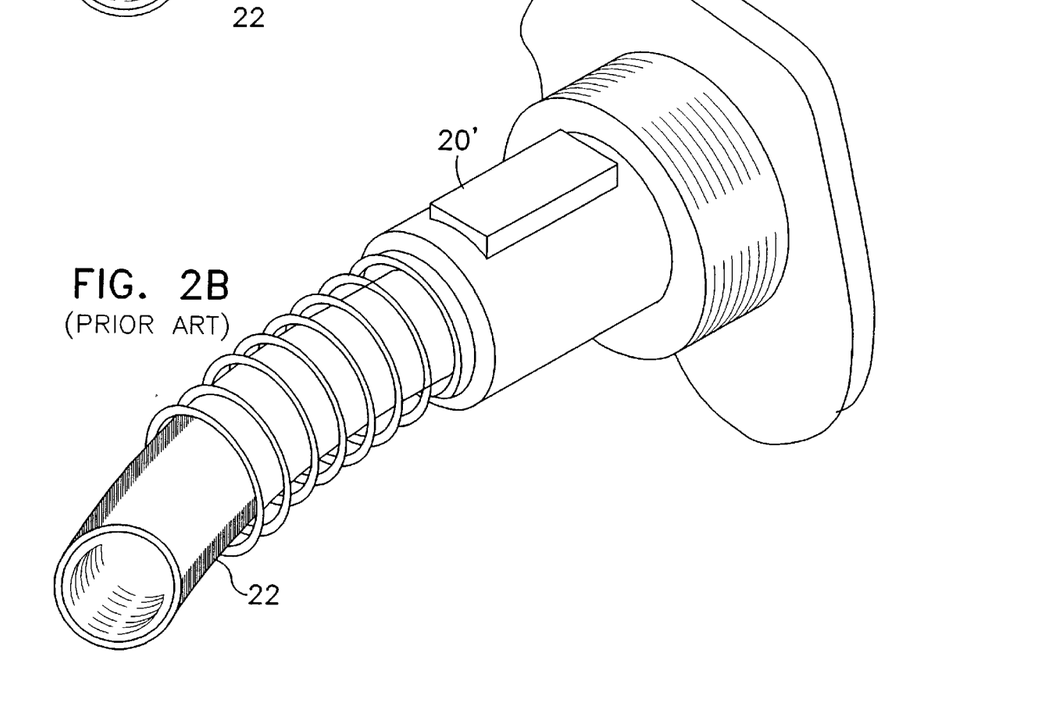
FIG. 2B is a simplified illustration of the mounting of another inductive communication loop and associated circuitry on a fuel delivery nozzle.
Figure 2C:
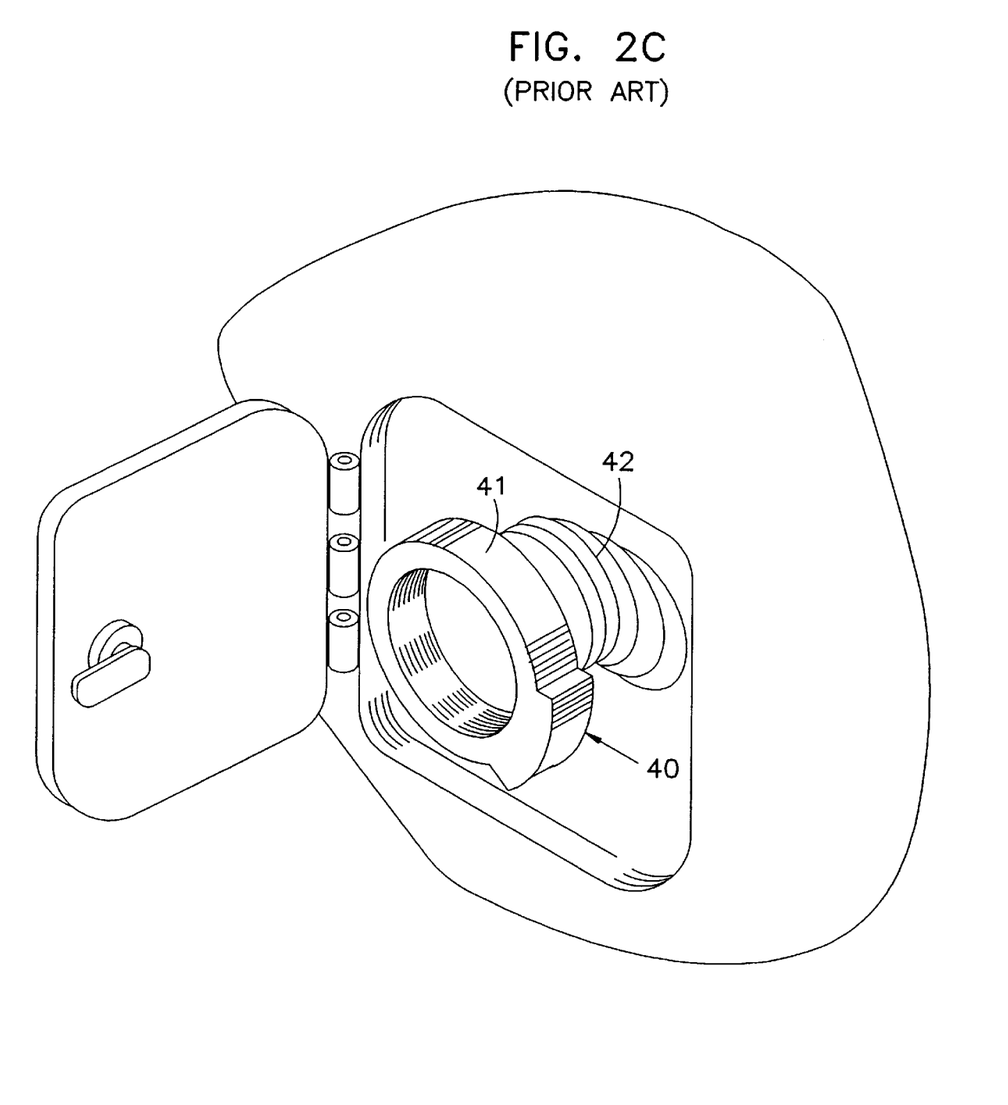
FIGS. 2C–D is a simplified illustration of the mounting of an inductive communication loop and associated circuitry on the fuel intake pipe of a vehicle.

Referring now additionally to FIGS. 2A, 2B and 2C, as known in applicant/assignee's existing prior art Fuelomat (Trademark) automated fuel management system, there is provided an inductive communication loop 20 associated with each delivery nozzle 22, and a data receiver 24 (FIG. 1) connected thereto by wiring 26 or wireless links for receiving data via the inductive communication loop 20. FIG. 2B shows an alternative embodiment of an inductive communication loop 20'.

A multiplicity of vehicles 30, each including a fuel tank with fuel intake pipe 42 mounted thereon and a vehicle fueling identification unit including an inductive communication loop 41 arranged to surround the fuel intake pipe and to transmit identification information concerning the vehicle to the data receiver 24 via the two inductive communication loops 40 and 20 or 40 and 20'.

The prior art Fuelomat fueling system required that the inductive communication loop 41 mounted on the inlet pipe 42 be powered by the vehicle battery and coupled to the vehicle odometer and possibly other vehicle instruments. This resulted in a relatively expensive vehicle fueling identification unit and relatively expensive installation thereof.

Figure 2D:
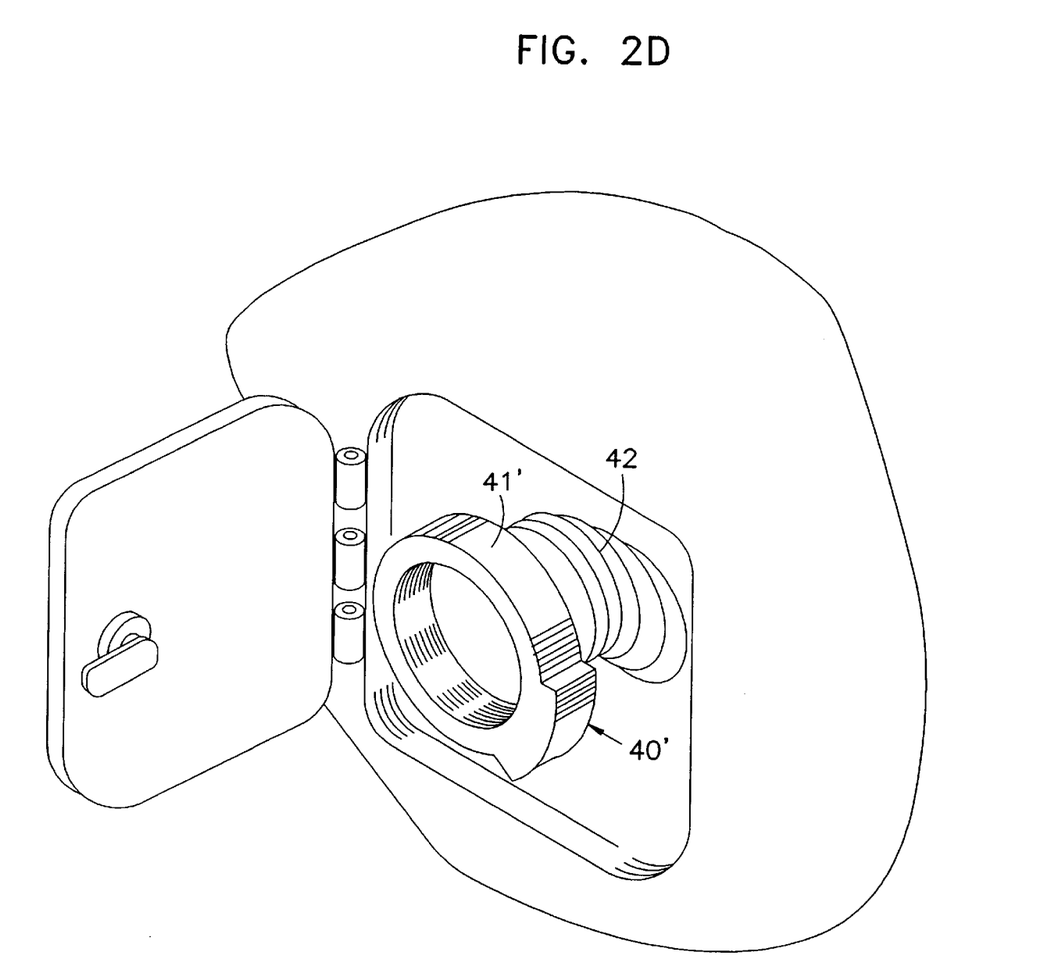

The present invention replaces the vehicle powered unit of the prior art with a self-contained passive vehicle mounted fueling system identification unit 40, as shown in FIG. 2D including an inductive communication loop 41, (FIG. 2D) arranged to surround the fuel intake pipe 42 of a vehicle and circuitry powered by electric power inductively received by the loop for transmitting via the loop at least one of the following parameters: vehicle identification number, credit information, required fuel particulars.

Typical mounting of the self-contained passive vehicle mounted fueling system identification unit 40' onto the fuel intake pipe 42 of a vehicle is shown in FIG. 2C. Preferably unit 40' is normally covered and out of sight during vehicle fueling and is retained with respect to the fuel intake pipe 42 against unacceptable vibrations, displacements and impacts.

Figure 3A:
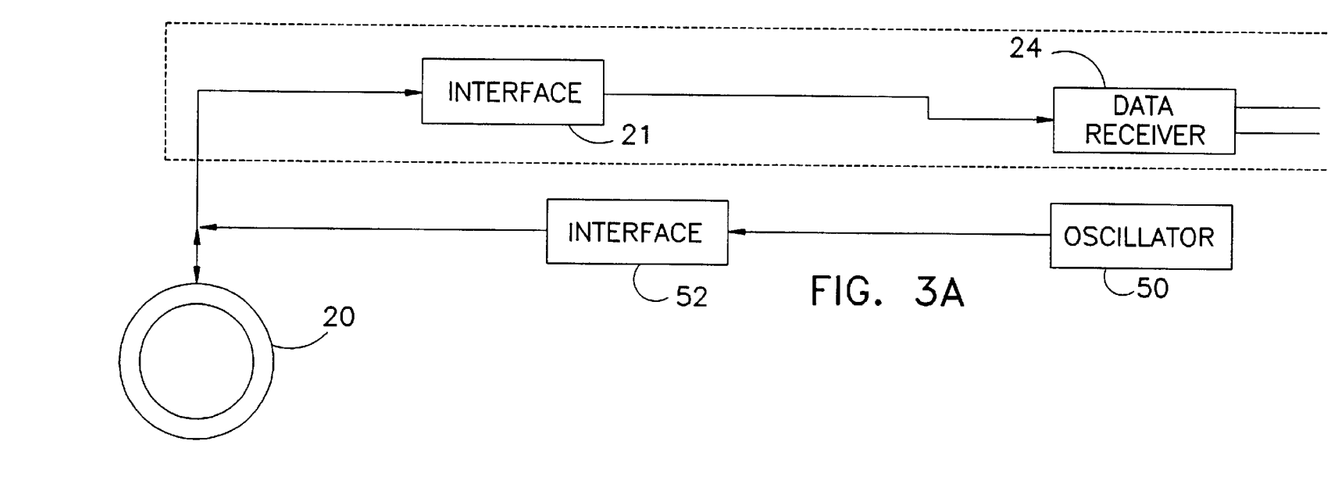
FIGS. 3A and 3B are simplified block diagram illustrations of apparatus resident respectively in a filling station and a vehicle forming part of a fueling system constructed and operative in accordance with a preferred embodiment of the present invention.

Reference is now made to FIG. 3A, which illustrates, in simplified block diagram form, fueling station mounted apparatus forming part of the fueling system of the present invention. The apparatus of FIG. 3A includes an inductive loop, such as loop 20, typically formed of a plurality of windings of an insulated conductor. As in the prior art, loop 20 is coupled via a conventional interface 21, to a data receiver 24 for reception of vehicle identification data from vehicles being fueled. Loop 20 may also be coupled to a data source (not shown) for data transmission to vehicles, if such functionality is desired.

In accordance with a preferred embodiment of the present invention, electrical power is transmitted from the fueling station mounted apparatus to the vehicle mounted apparatus, obviating the need for an electrical power connection of the vehicle mounted apparatus to the vehicle battery and thus greatly simplifying and reducing the cost of the vehicle mounted apparatus.

In accordance with a preferred embodiment of the present invention, the electrical power is provided by an oscillator 50, which outputs AC electrical power, via any suitable interface 52, to loop 20, which is the same loop which is used for data communication. The presence of loop 20 in propinquity to vehicle mounted loop 41' during fueling inductively couples the two loops and is operative to transfer AC electrical power in a wireless and contactless manner from loop 20 to loop 41'.

Figure 3B:
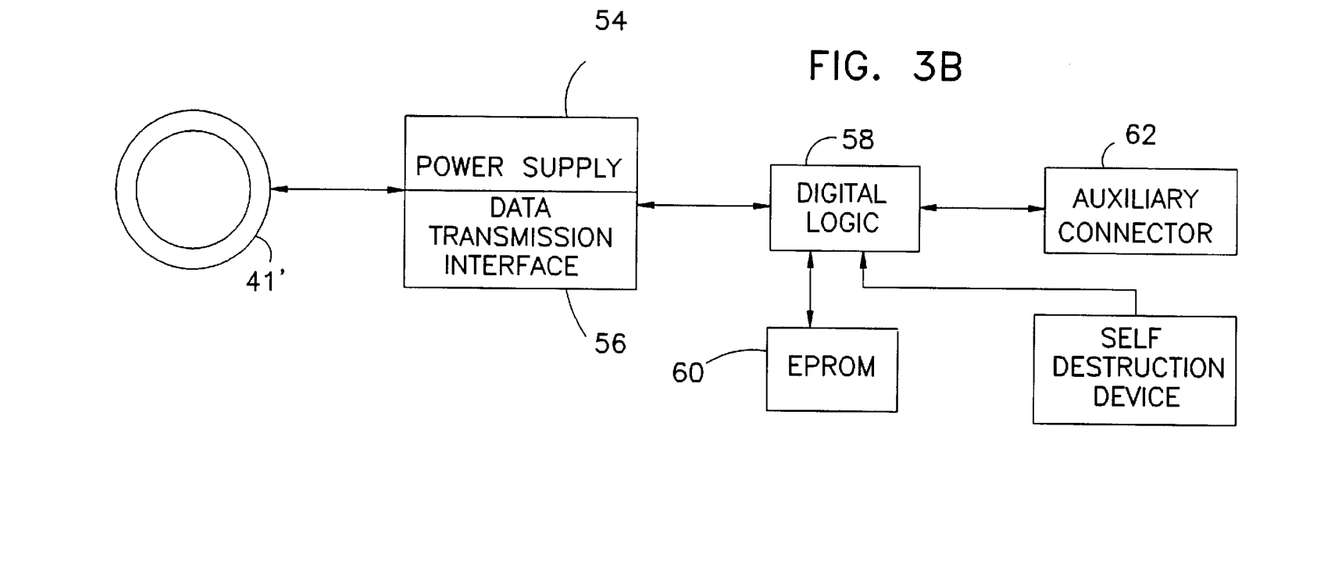

As illustrated in FIG. 3B, loop 41', which may be identical to loop 20, is coupled to a power supply 54, such as capacitor or battery, which stores electrical power received inductively from loop 20 and is also coupled via a data transmission interface 56 to digital logic circuitry 58. Digital logic circuitry 58 typically interfaces with a storage device such as an EPROM 60 and may also be associated with an auxiliary connector 62. A tamper-activated self destruct device 64, such as a microswitch controlled data source, may be provided so as to automatically and irreversibly deactivate the digital logic 58 in response to tampering.

The EPROM 60 typically stores various vehicle and fueling system identification parameters, such as vehicle identification number, credit information, required fuel particulars. Other parameters may be stored as well. These parameters are transmitted by digital logic circuitry 58 via loops 41' and 20 to data receiver 24 during fueling of a vehicle.

Figure 4:
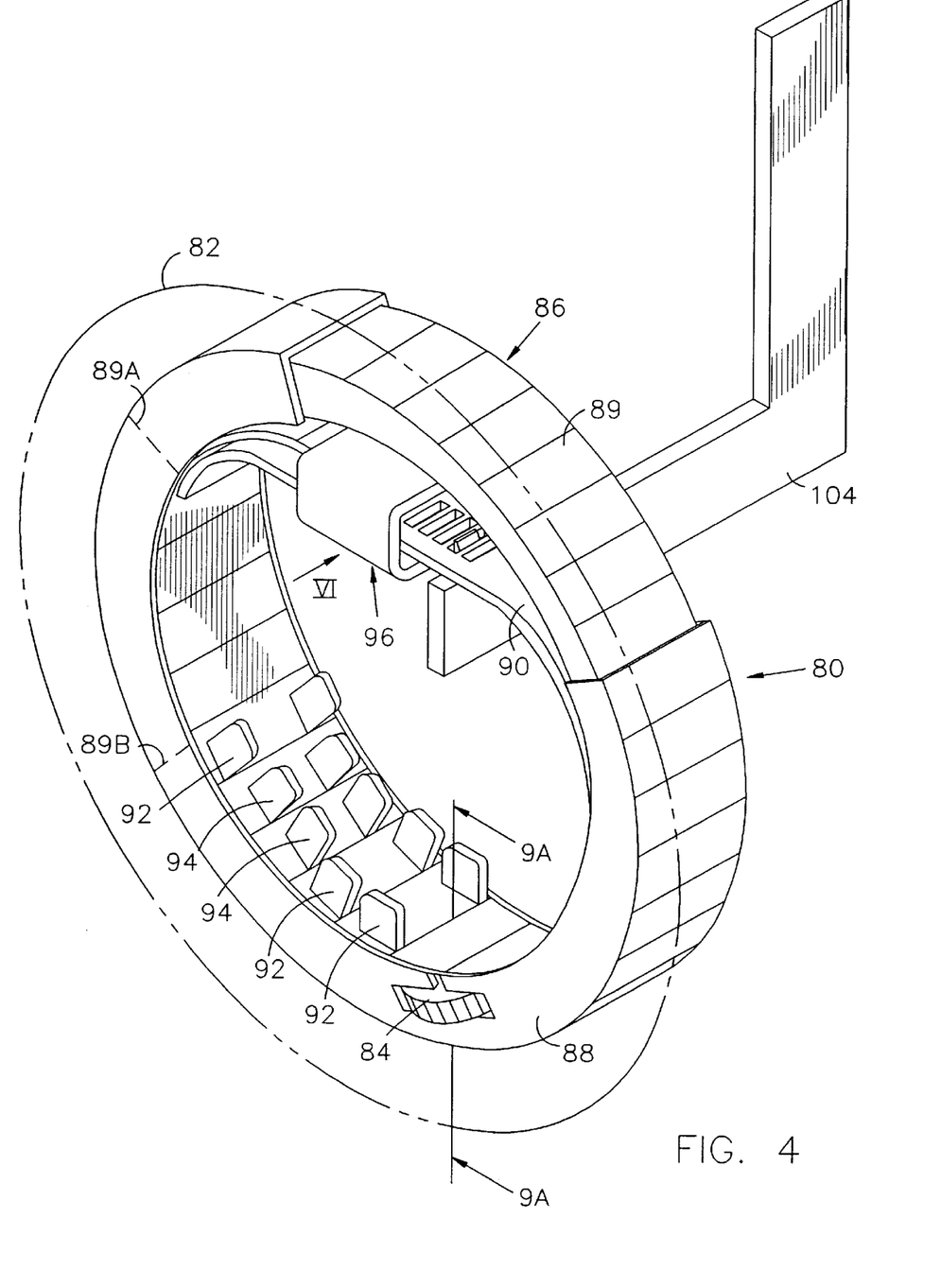
FIG. 4 is a pictorial illustration of a passive transceiver mountable inside a fuel inlet pipe in accordance with a preferred embodiment of the present invention and an installation tool thereof.
Figure 5:
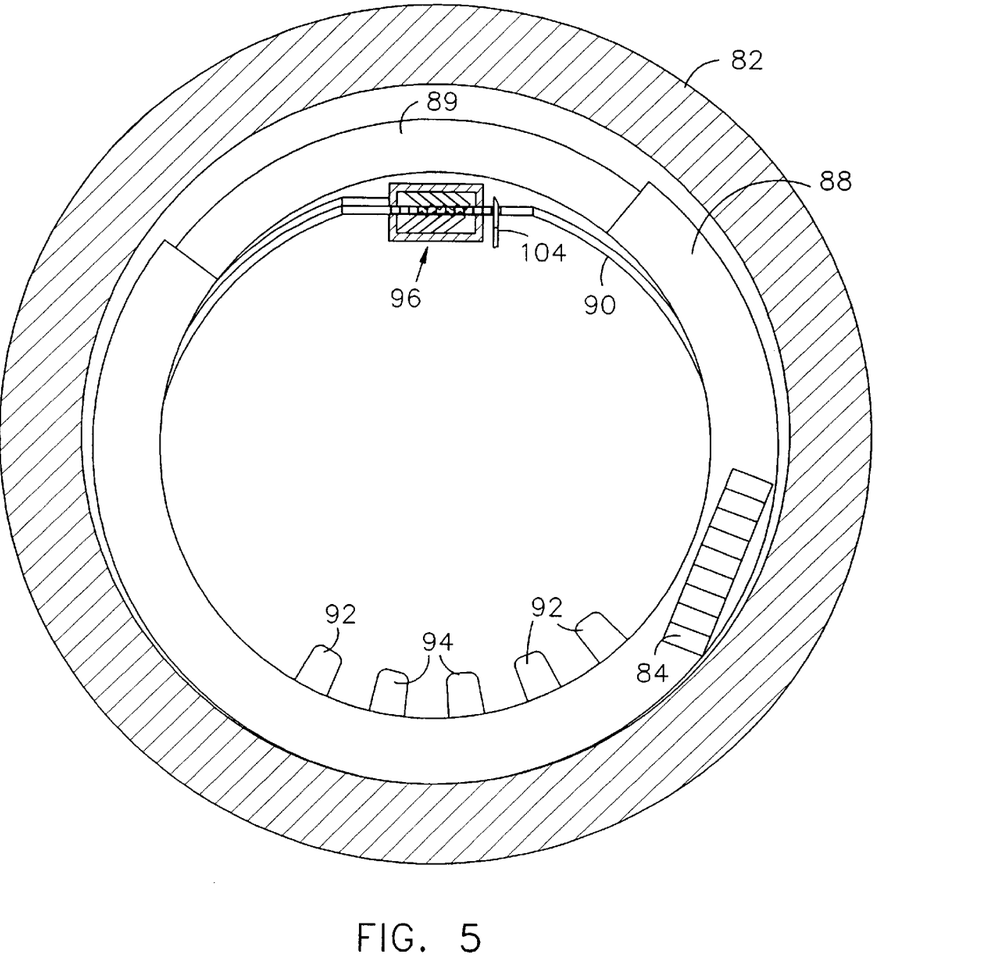
FIG. 5 is a plan view of a transceiver of the type shown in FIG. 4 located inside a fuel inlet pipe of a vehicle.
Figure 6A:
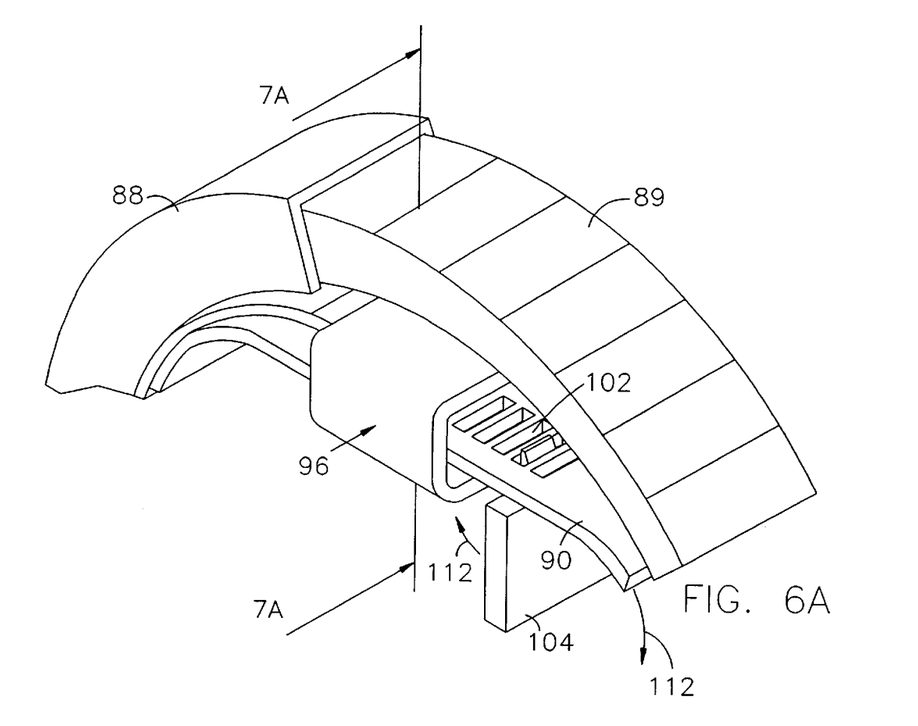
FIGS. 6A and 6B are detailed partial illustrations of two stages in the installation of the transceiver of FIGS. 4 and 5 within a fuel inlet pipe, as viewed in the direction of the arrow VI, in accordance with a preferred embodiment of the present invention.
Figure 6B:
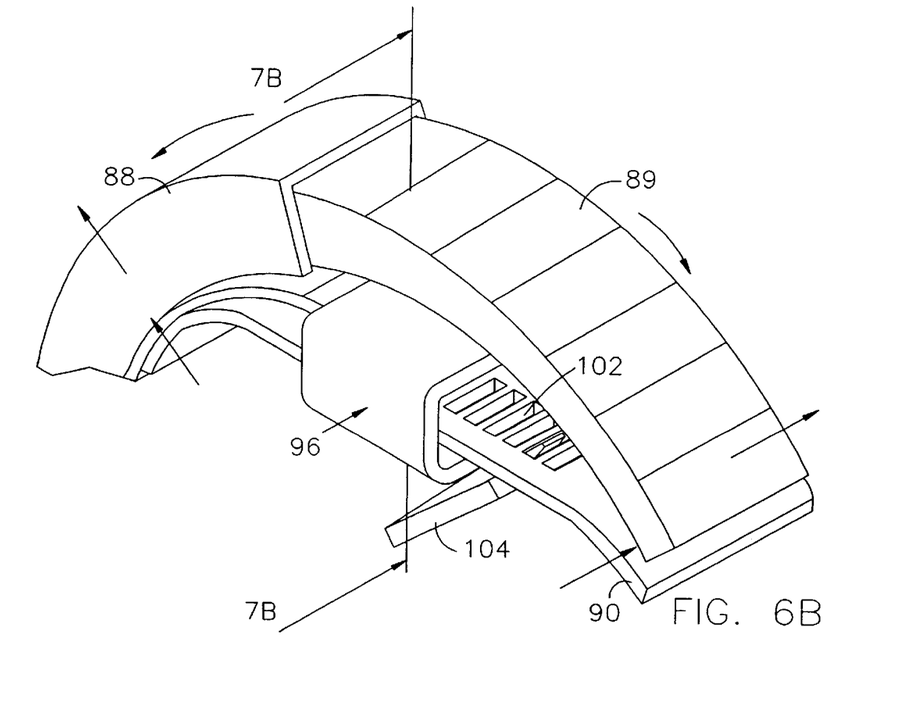
Figure 9A:
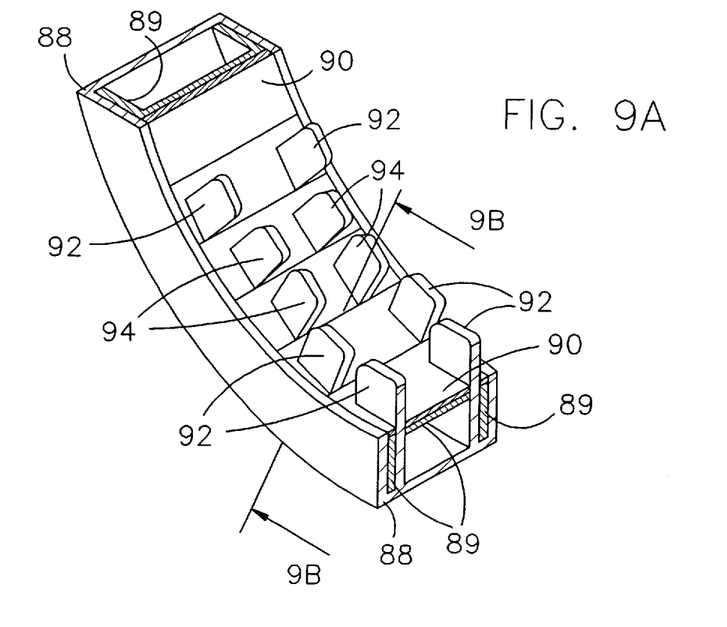
FIGS. 9A and 9B are sectional illustrations showing part of the internal construction of the transceiver of FIG. 4, respectively taken along the lines 9A—9A in FIG. 4 and the lines 9B—9B in FIG. 9A.
Figure 9B:
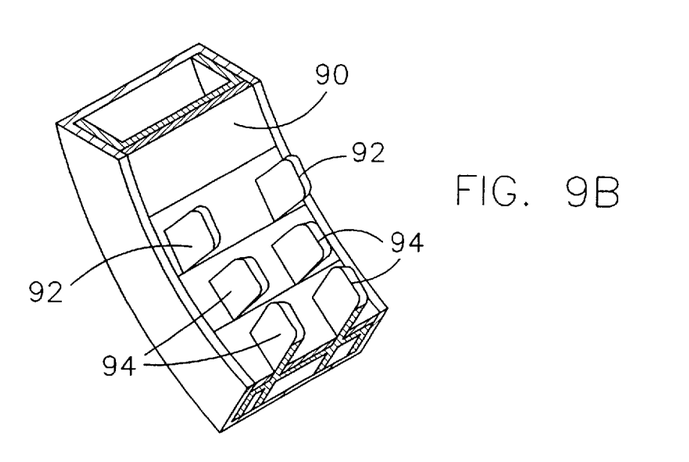

Reference is now made to FIGS. 4 and 5, which illustrate another preferred embodiment of an identification unit assembly 80 which is arranged to be mounted inside a fuel inlet pipe 82. As seen particularly in FIG. 4, the identification unit, which typically comprises a transceiver 84 is disposed in a generally annular housing assembly 86 which includes a first portion 88 which subtends approximately 270 degrees of arc, a second portion 89 which also subtends approximately 270 degrees of arc and an extendible band 90. The two ends of the second portion 89 are shown as dashed hidden lines 89A and 89B. It is seen in FIGS. 9A and 9B that the cross-sectional shape of the first portion 88 resembles the letter U, while the cross-sectional shape of the second portion 89 resembles an inverted U. The second portion 89 fits inside the first portion 88 and as is seen particularly in FIG. 4, the open end of the second portion 89, that is the open section between lines 89A and 89B, is not aligned with the open end of the first portion 88, but rather is inside the first portion 88.

The first portion 88 is provided with a first plurality of tabs 92 and the second portion 89 is provided with a second plurality of tabs 94. As is seen clearly in FIGS. 9A and 9B, the first plurality of tabs 92 passes through the second portion 89 and the band 90, and the second plurality of tabs 94 passes through the band 90. Both pluralities of tabs are bent over in the final assembly to securely fasten the band 90 to the first 88 and second 89 portions.

As shown in FIG. 4, the transceiver 84 is mounted in a recess between the first 88 and second 89 portions. The transceiver 84 may be mounted by any method, such as with mechanical fasteners or by bonding.

The housing assembly 86 is expandable and thus can be adapted for mounting in fuel intake pipes with different diameters. In accordance with a preferred embodiment of the present invention, a ratchet type securing assembly 96 is operative to expand the band 90 outwardly causing the band 90 to press the second portion 89 outwardly against the first portion 88, which in turn presses against the interior of the fuel inlet pipe 82 and thus secures the housing assembly 86 in tight engagement with the interior of the fuel inlet pipe 82.

Figure 7A:
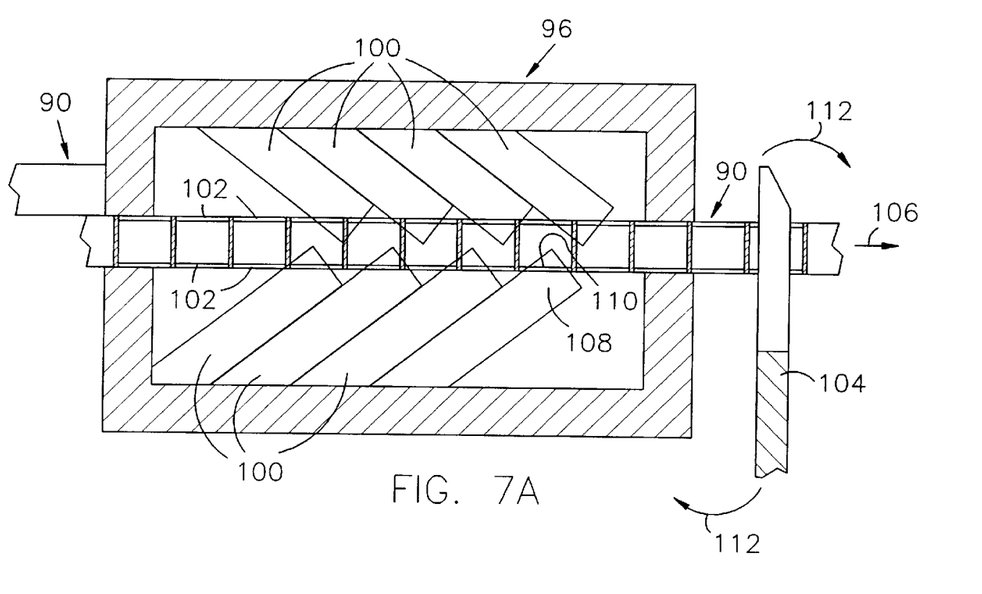
FIGS. 7A and 7B are sectional illustrations, taken along the lines 7A—7A and 7B—7B in FIGS. 6A and 6B, respectively.
Figure 7B:
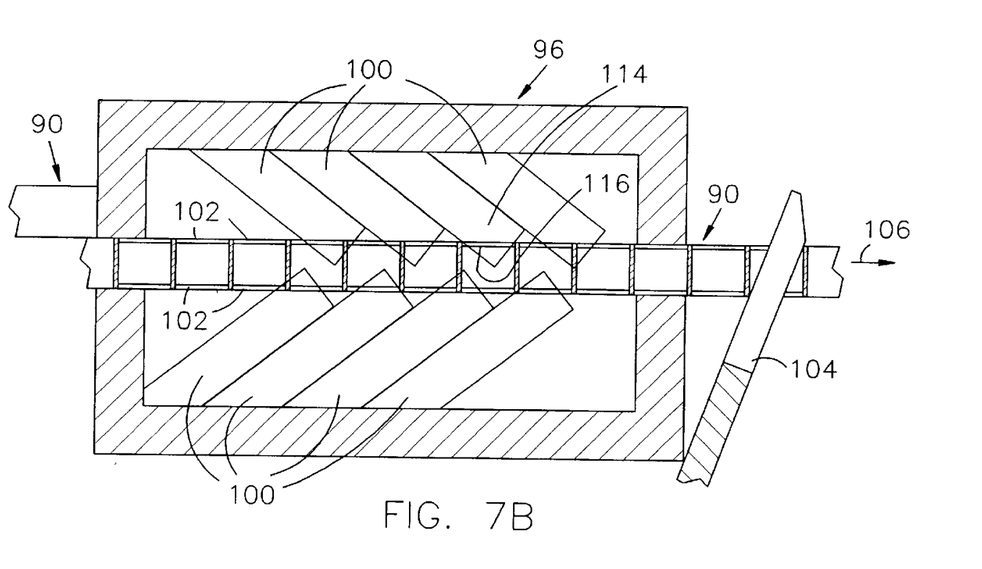

The securing assembly 96 comprises a plurality of engagement teeth 100, as shown clearly in FIGS. 7A and 7B. The teeth 100 are adapted to engage with a plurality of notches 102 on the band 90. It is a particular feature of the present invention that only one tooth of the plurality of teeth 100 is engaged at one time with any one of the notches 102. A tool 104 engages one of the notches 102 and is operative to advance the band 90 notch by notch in the direction indicated by the arrow 106 in FIGS. 7A and 7B.

In FIG. 7A, initially only a tooth indicated by reference numeral 108 is engaged in a notch indicated by reference numeral 110. All other teeth 100 are misaligned with their corresponding notches 102. As the tool 104 is turned in the direction indicated by arrows 112, the band 90 is advanced in the direction 106 and the tooth 108 becomes disengaged from notch 110 and a different tooth 114 becomes engaged in a notch 116 as is shown in FIG. 7B. This arrangement of teeth and notches allows for fine incremental expansion of the band 90 and operates on the principle of a Vernier scale in which only one tooth is aligned with a notch at a time. Additionally in a preferred embodiment of the present invention, the teeth 100 are divided into two parallel, slightly offset groups of upper and lower teeth as is shown in FIGS. 7A and 7B. This arrangement conserves volume.

As seen in FIGS. 6A, 6B, 8A and 8B, advancement of the band 90 by means of the tool 104 causes the band 90 to press against the second portion 89 which in turn presses against the first portion 88 which presses against the interior of the fuel pipe 82, thereby tightening the housing assembly 86 against the interior of the fuel inlet pipe 82. The band 90 presses against the second portion 89 which then presses against the first portion 83 because all three are attached to one another at the bottom by means of the tabs 92 and 94. The ends of the band 90 near the assembly 96 are free to expand outwardly and to press against the second portion 89.

Figure 8A:
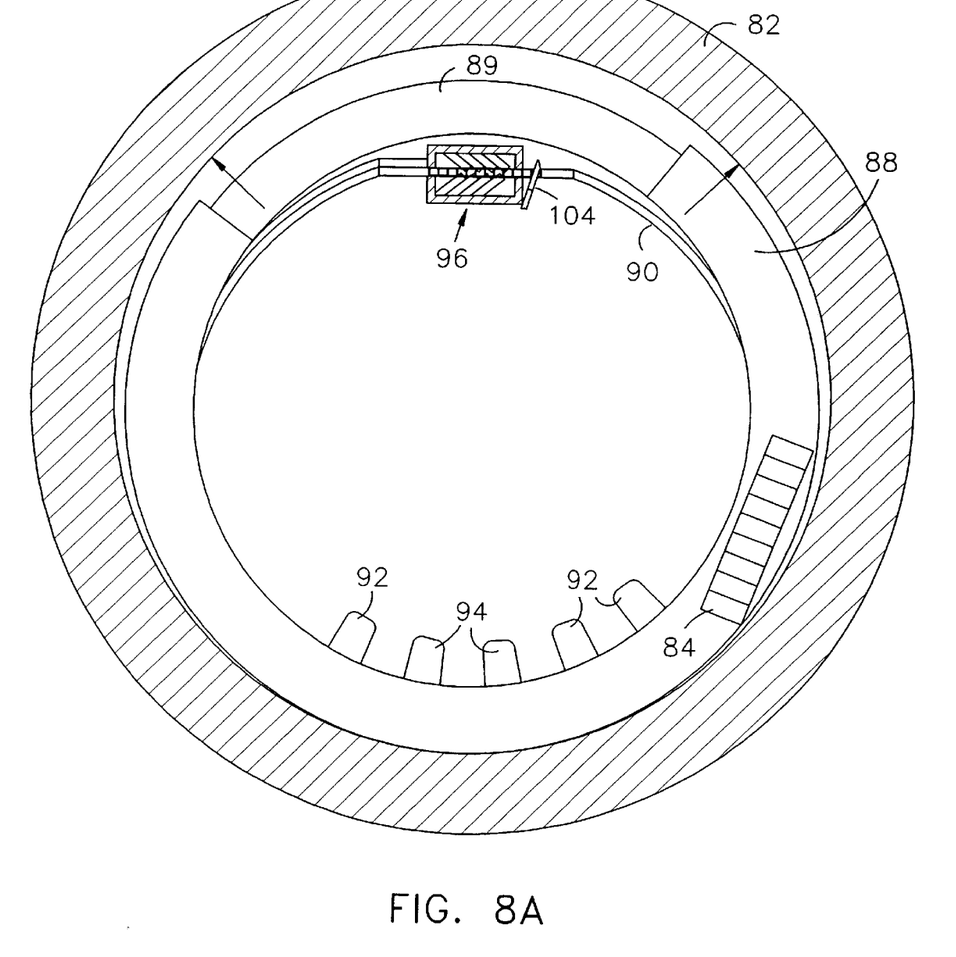
FIGS. 8A and 8B are plan views of two stages in the installation of the transceiver of FIGS. 4 and 5 within a fuel inlet pipe in accordance with a preferred embodiment of the present invention.
Figure 8B:
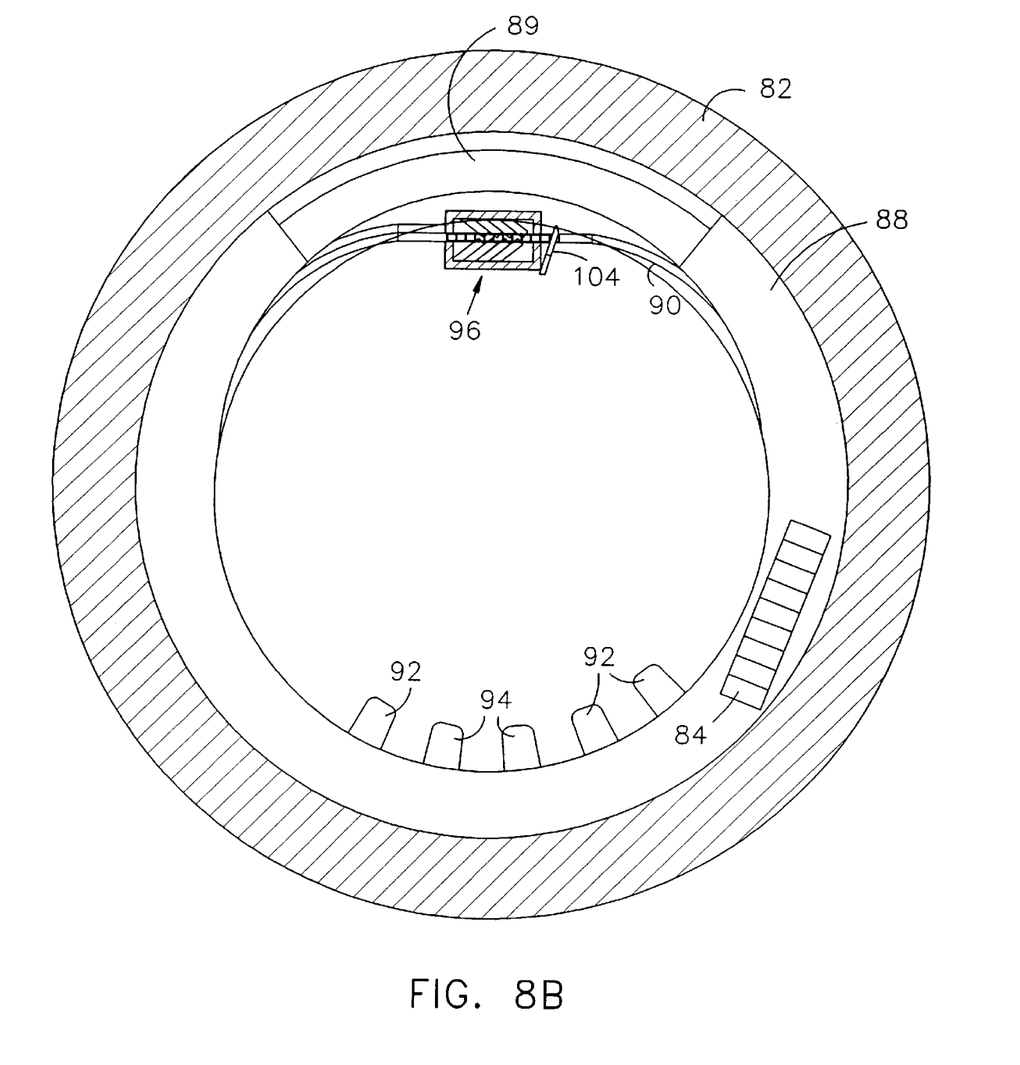

FIGS. 8A and 8B illustrate the sequential tightening of housing assembly 86 in inlet pipe 82.

Figure 10A:
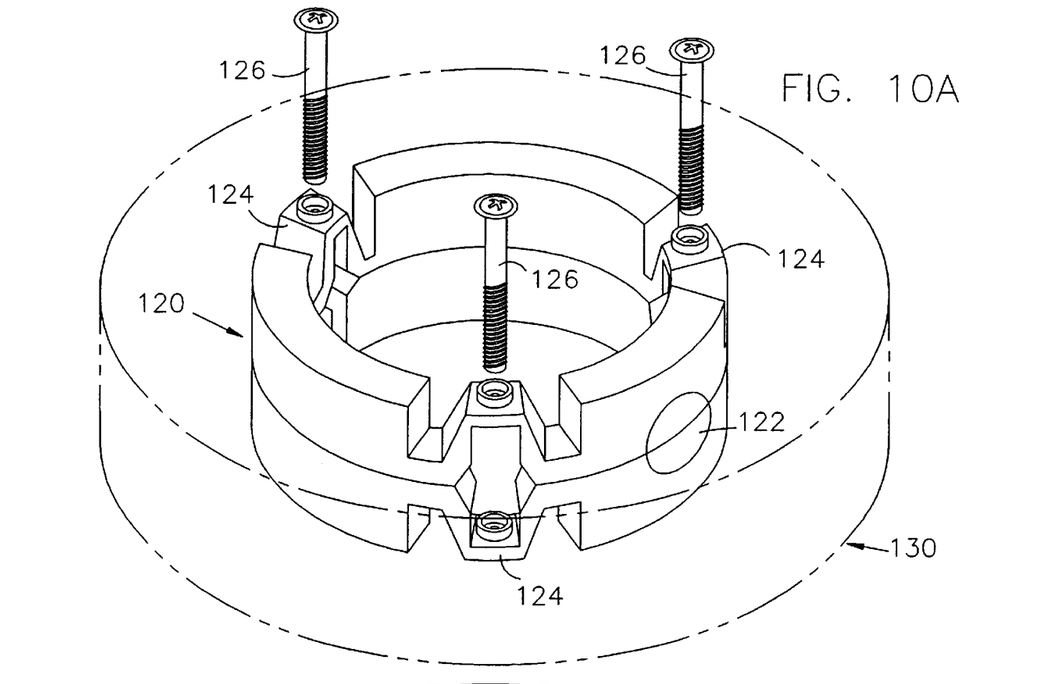
FIGS. 10A and 10B are pictorial illustrations of two stages in the installation of an alternative embodiment of transceiver in a fuel inlet pipe.
Figure 10B:
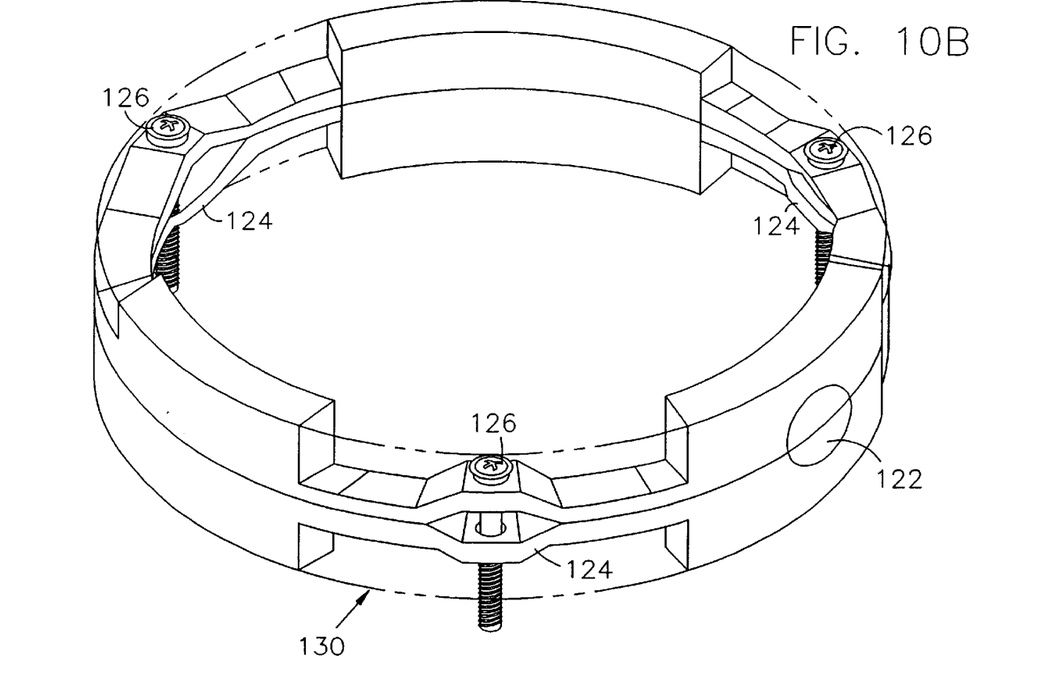

Reference is now made to FIGS. 10A and 10B, which illustrate an alternative construction of a identification unit transceiver useful in the system of the present invention. Here a housing assembly 120 containing an identification unit 122 is formed with a plurality of compression activated expansion joints 124. A plurality of screws 126 operatively engage the expansion joints 124, which may have threading (not shown) for engagement with the screws.

As seen in FIG. 10B, tightening of screws 126 in engagement with expansion joints 124 produces expansion of the expansion joints and increases the overall outer radius of the housing assembly 120, causing it to tightly engage the interior of a fuel inlet pipe 130.

It will be appreciated by persons skilled in the art that the present invention is not limited by what has been particularly shown and described hereinabove. Rather the scope of the present invention is defined only by the claims which follow:

We claim:

1. A vehicle mounted fueling system identification unit including an inductive communication loop mounted in a fuel intake pathway of a vehicle and circuitry powered by electric power inductively received by the loop for transmitting via the loop at least one of the following parameters: vehicle identification number, credit information, required fuel particulars, wherein the fuel intake pathway is defined by a fuel inlet pipe, and wherein at least one of said inductive communication loop and said circuitry is mounted in an expandable housing which is securely mountable to the interior of the fuel inlet pipe.

2. Apparatus according to claim 1 and wherein said expandable housing is formed with a ratchet-type securing assembly.

3. Apparatus according to claim 1 and wherein said expandable housing is formed with compression actuated expansion joints.

* * * * *